United States Patent [19]

Takayama et al.

[11] Patent Number: 5,531,906

[45] Date of Patent: Jul. 2, 1996

[54] PROCESS FOR TREATMENT OF SODIUM HYDROXIDE WASTE LIQUOR CONTAINING ALUMINUM

[75] Inventors: Susumu Takayama; Yasuie Mikami; Nobuyoshi Iyatomi; Minoru Orikasa, all of Tokyo, Japan

[73] Assignee: Nittetsu Mining Co., Ltd., Tokyo, Japan

[21] Appl. No.: 283,532

[22] Filed: Aug. 1, 1994

[30] Foreign Application Priority Data

Jul. 30, 1994 [JP] Japan .................... 5-208784

[51] Int. Cl.⁶ .................................................... C02F 1/62
[52] U.S. Cl. .................. 210/712; 210/912; 423/115; 423/420.2; 423/600
[58] Field of Search ............................ 210/712, 912; 423/115, 420.2, 600

[56] References Cited

U.S. PATENT DOCUMENTS

| | | | |
|---|---|---|---|
| 3,539,306 | 11/1970 | Kumura et al. | 423/432 |
| 4,539,195 | 9/1985 | Schanz et al. | 423/420.2 |
| 4,560,545 | 12/1985 | Spickett et al. | 423/420.2 |
| 4,566,912 | 1/1986 | Borg | 210/712 |
| 4,904,457 | 2/1990 | Misra | 423/420.2 |
| 5,250,279 | 10/1993 | Preston et al. | 423/420.2 |

FOREIGN PATENT DOCUMENTS

| | | | |
|---|---|---|---|
| 5021 | 1/1985 | Japan | 423/420.2 |

OTHER PUBLICATIONS

Journal of Solid State Chemistry, vol. 94, No. 2, 1991, pp. 244–253, Ian E. Grey and Roland Ragozzini, "Formation and Characterization of New Magnesium Aluminum Hydroxycarbonates".
Database WPI Week 7648, Derwent Publications, Ltd., London, GB; AN 76-89679X/48 for JP-A-51 117 196 (Nittetsu Mining Ltd) 16 Oct. 1976.
Database WPI Week 8808, Derwent Publications, Ltd., London, GB; AN 88-052711/08 for JP-A-63 008 215 (Kureha Chem Ind KK) 14 Jan. 1988.

Primary Examiner—Neil McCarthy
Attorney, Agent, or Firm—Sughrue, Mion, Zinn, Macpeak & Seas

[57] ABSTRACT

A process for treating sodium hydroxide waste liquor containing aluminum, comprising the steps of: adding, to aluminum-containing sodium hydroxide waste liquor, at least one of MgO and $Mg(OH)_2$ in an amount of 0.5 to 3 moles with respect to 1 mole of aluminum to cause a reaction at 70° C. or more; and separating and removing a precipitated magnesium-aluminum compound is disclosed. The present invention makes it possible to recover recyclable sodium hydroxide from an aluminum-containing sodium hydroxide waste liquor. Even if the recovering procedure is repeated, no carbonate ions are accumulated. Therefore, it is possible to prevent degradation of the treating solution containing sodium hydroxide. Further, the by-product is a useful compound, and thus, there is no problem in the reprocessing or disposal of the by-product.

13 Claims, 3 Drawing Sheets

PROCESS FOR TREATMENT OF SODIUM HYDROXIDE WASTE LIQUOR CONTAINING ALUMINUM

BACKGROUND OF THE INVENTION

1. Field of the Invention

The present invention relates to a process for treatment of aluminum-containing sodium hydroxide waste liquor produced by treating aluminum articles with a sodium hydroxide solution or the like, so as to recover recyclable sodium hydroxide. Accordingly, the present invention may be appropriately applied to the treatment of aluminum-containing sodium hydroxide waste liquor derived from, for example, the alkali washing solutions used in factories manufacturing an aluminum sash or alumite, or used for dies in aluminum extrusion factories.

2. Description of the Related Art

As the conventional treatment of aluminum-containing sodium hydroxide waste liquors discharged when treating a surface of or dissolving metal aluminum or aluminum alloys with a sodium hydroxide solution, there were known hitherto (1) the neutralization process by adding acid, and (2) the process for recovering the aluminum hydroxide and sodium hydroxide solution using the Bayer process. The above process (1) is simple in procedure, but the sludge produced by neutralization contains aluminum hydroxide as a main ingredient and includes a large amount of water, so its treatment is difficult. Further, it was not possible to regenerate the sodium hydroxide for recycle. The above process (2) required a long reaction time (for about 24 to 48 hours). Further, aluminum hydroxide was poorly separated from sodium hydroxide, and thus, a relatively large amount of aluminum was present in the recovered sodium hydroxide solution. Therefore, various problems occurred at the time of reuse of the recovered sodium hydroxide solution, such as precipitation of aluminum hydroxide and deposition on container walls as scale. If a masking agent such as sodium gluconate was used to remedy such defect, separation and recovery of the sodium hydroxide solution and aluminum hydroxide were not possible.

Under the circumstances, the present inventors and the co-workers proposed a process for recovering calcium aluminate and sodium hydroxide waste liquor, by adding calcium hydroxide [Japanese Examined Patent Publication (Kokoku) No. 54-4720]. In the process, aluminum was precipitated and separated in the form of $3CaO-Al_2O_3-6H_2O$ from the aluminum-containing sodium hydroxide waste liquor to regenerate sodium hydroxide. However, when the above regeneration steps were repeated, carbon dioxide gas present in the air was absorbed and accumulated in the sodium hydroxide solution to form sodium carbonate, so there was the problem that the etching ability of the regenerated solution was lowered.

Further, Japanese Unexamined Patent Publication (Kokai) No. 55-144415 disclosed a process for recovering a sodium hydroxide solution from the above sodium hydroxide waste liquor by adding aluminum sludge containing aluminum hydroxide as a main ingredient and then silicate to said waste liquor. However, the reaction between the aluminum in the waste liquor and the silicates in the above process produce zeolite, which is different from hydrotalcite produced in the process according to the present invention as mentioned below.

Japanese Unexamined Patent Publication (Kokai) No. 63-8215 disclosed a process for adding magnesium oxide to an aqueous solution containing a high concentration of sodium hydroxide, and allowing the whole to stand. The process, however, was not designed to treat aluminum waste liquor, but to remove chromium or nickel included as impurities in an industrial aqueous solution containing a high concentration of sodium hydroxide.

Japanese Unexamined Patent Publication (Kokai) No. 60-90816 disclosed a process for regenerating an aluminum-containing sodium hydroxide solution by adding a calcium compound for the treatment, whereas a magnesium compound is added in the process of the present invention as mentioned below.

Japanese Unexamined Patent Publication (Kokai) No. 4-265220 discloses a process for recovering sodium hydroxide containing aluminate ions including aluminum atoms. In the above process, however, chelating agents were used, whereas a magnesium compound is used in the process of the present invention as explained below.

Japanese Unexamined Patent Publication (Kokai) No. 2-196016 discloses a process for treating a sodium hydroxide solution in which aluminum is dissolved. In the above process, however, solid particles, such as synthetic zeolite or silicon carbide is added to remove the scale and concentrating the sodium hydroxide, whereas a magnesium compound is added in the process of the present invention as explained below.

SUMMARY OF THE INVENTION

The present inventors found that sodium hydroxide can be recovered in a yield of at least 85%, by adding a specific amount of magnesium oxide or hydroxide to aluminum-containing sodium hydroxide waste liquor to cause a reaction therein; that the by-product (reaction product) obtained by the above regenerating reaction contains not only magnesium and aluminum, but also carbonate ions, and thus, the unnecessary components can be removed from the waste liquor at the same time; and further, that the by-product (reaction product) is useful as a flame retardant or the like.

Accordingly, the object of the present invention is to solve the problems in the prior art relating to the recovery and reuse of aluminum-containing sodium hydroxide waste liquor and to provide the by-product obtained by the treatment of the waste liquor in an efficiently recyclable form.

Other objects and advantages of the present invention will be apparent from the following description.

The present invention relates to a process for treating sodium hydroxide waste liquor containing aluminum, comprising the steps of adding, to aluminum-containing sodium hydroxide waste liquor, at least one of MgO and $Mg(OH)_2$ in an amount of 0.5 to 3 moles with respect to 1 mole of aluminum to cause a reaction at 70° C. or more, and separating and removing a precipitated magnesium-aluminum compound.

DESCRIPTION OF THE PREFERRED EMBODIMENTS

Figure 1:
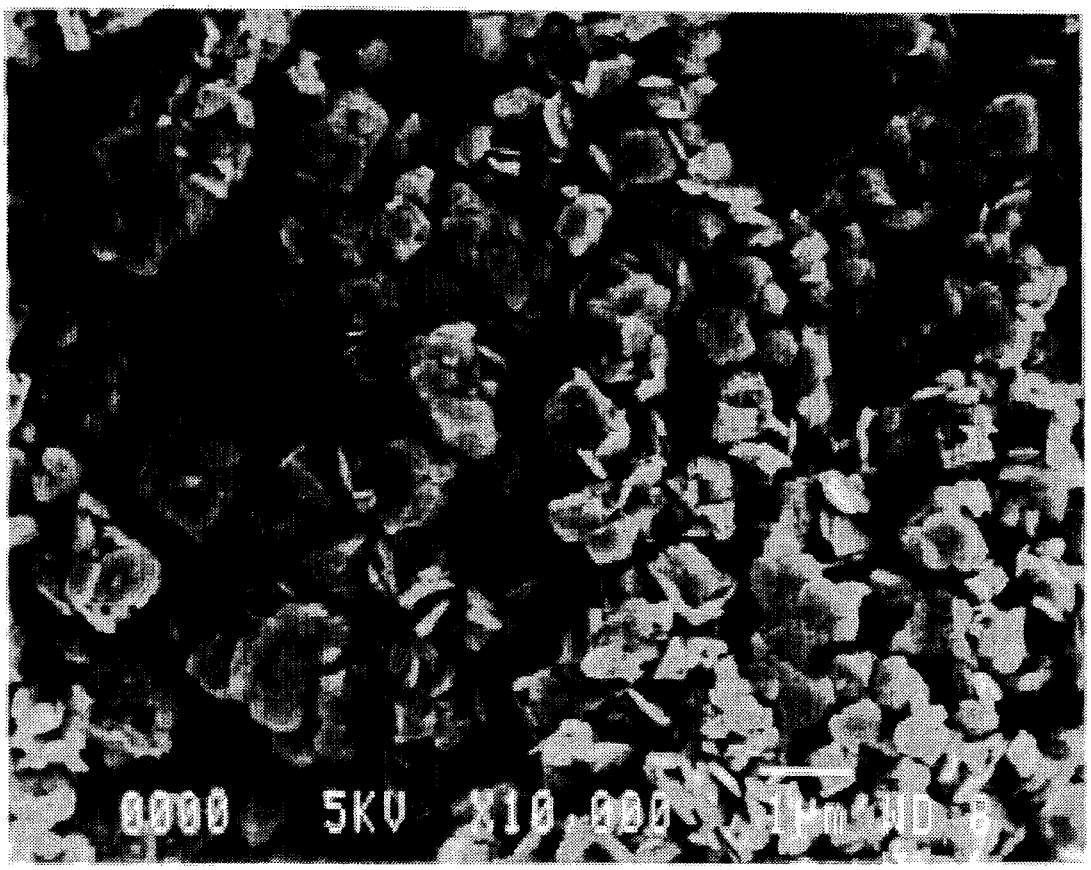
FIG. 1 is an electron micrograph (10000x) showing the structure of the crystal obtained in Example 2.

According to the present invention, any waste liquor produced when treating an aluminum article with a sodium hydroxide solution may be treated. It is preferable to adjust the concentration of sodium hydroxide to 300 g/l or less, more preferably 80 to 150 g/l, prior to the treatment by the process of the present invention. If the concentration of sodium hydroxide exceeds 300 g/l, the viscosity of the waste liquor becomes high and the amount of sodium hydroxide adhered to the crystal obtained by the treatment reaction becomes large, and thus, the yield of sodium hydroxide is decreased.

The amount of the MgO and/or $Mg(OH)_2$ added is 0.5 to 3.0 moles with respect to 1 mole of aluminum present in the sodium hydroxide waste liquor. If the amount added is less than 0.5 mole, a large amount of aluminum remains in the treated and recovered sodium hydroxide solution. Therefore, when the recovered solution is reused, aluminum hydroxide is precipitated. If the amount added is more than 3.0 moles, a large amount of unreacted magnesium salts undesirably remain in the crystal precipitated. When the treated and recovered sodium hydroxide solution is reused for treating aluminum articles, it is not preferable to completely remove all of the aluminum component.

The reaction temperature of the process of the present invention is in general at least 70° C., preferably 80° to 120° C., more preferably 90° to 110° C. under ordinary pressure. If the reaction temperature is lower than 70° C., the reaction rate becomes too slow and thus, a long reaction time is required. Further, a part of MgO added remains unreacted. If the reaction temperature is over 120° C., pressurization is required and the apparatus becomes complicated. The reaction time in the process of the present invention is in general at least 4 hours, preferably 6 to 8 hours. If the reaction time is less than 4 hours, a part of each of MgO and $Mg(OH)_2$ added remains unreacted in the crystal.

When the aluminum-containing sodium hydroxide waste liquor is treated in the process of the present invention as explained above, a magnesium-aluminum compound is precipitated as a white crystal. The magnesium-aluminum compound is hydrotalcite of the formula:

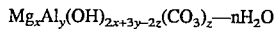
$$Mg_xAl_y(OH)_{2x+3y-2z}(CO_3)_z \cdot nH_2O$$

wherein, x and y are positive numbers satisfying $0.5 \leq x/y \leq 10$, z is a number satisfying $0.1 < z < 5$, and n is a number satisfying $0 \leq n \leq 10$.

It is possible to separate from the mother liquor obtained in the process of the present invention the white crystal of the magnesium-aluminum compound as mentioned above by the usual separation methods, for example, suction filtration, centrifugal separation, or filter pressing. The regenerated sodium hydroxide solution obtained by removing the crystal does not contain magnesium or carbonate ions, but includes an adjusted amount of an aluminum component. Therefore, the regenerated sodium hydroxide solution can be used as a treating solution for aluminum articles again.

The hydrotalcite obtained as a by-product in the treating process according to the present invention is useful, for example, as a flame retardant which may be incorporated into a synthetic resin as a filler; as a neutralizing agent for a ziegler catalyst; a heat stabilizer for polyvinyl chloride, or the like. Therefore, the present invention surmounts the disadvantages in the prior art, i.e., the reprocessing or disposal of a undesirable by-product.

Further, the process of the present invention makes it possible to regenerate the sodium hydroxide solution in 1/10th to 1/20th the time required in the conventional process of recovering aluminum hydroxide and a sodium hydroxide solution using the Bayer process. Furthermore, it is possible to control the concentration of aluminum in the sodium hydroxide solution by adding a magnesium salt.

EXAMPLES

The present invention now will be further illustrated by, but is by no means limited to, the following Examples. In the following Examples, the recovery rate (R) of the sodium hydroxide was calculated by the following formula:

$$R = \frac{\text{Total NaOH in recovered solution}}{\text{NaOH based on Na in waste liquor to be treated}}$$

If the amount of the magnesium oxide (MgO) or magnesium hydroxide $(Mg(OH)_2)$ added is increased, the amount of the hydrotalcite crystal produced is increased and thus, the amount of water adhered to the crystal is increased. Therefore, sodium hydroxide is discharged from the system together with the crystal accompanying with the adhered water and thus, the recovery rate of NaOH is reduced.

Example 1

Magnesium oxide (MgO) (157 g) was added to 10 liters of sodium hydroxide waste liquor (Na=53.3 g/l; Al=21.0 g/l; and $CO_3$=4.16 g/l) obtained from a surface treatment of aluminum articles and a reaction was carried out at a solution temperature of 100° C. for 7 hours under stirring. The produced crystal was separated, and then, the composition of the resulting recovered solution (9.41 liters) was analyzed. The results are as follows:

Na=54.4 g/l, Al=16.0 g/l, and $CO_3$=0.76 g/l.

Further, the separated crystal was washed and dried, and then, the composition of the resulting crystal (443 g) was analyzed. The results are as follows:

Na=0.02% by weight, Al=12.0% by weight,

Hg=21.3% by weight, and $CO_3$=7.10% by weight.

It is noted that Na is a component included in the water adhered to the crystal and is not a component of the crystal per se (same as in the following description). The recovery rate of NaOH was 96.0% and the content of Mg in the recovered solution was less than 0.005%.

Example 2

The procedure described in Example 1 was repeated except that magnesium oxide (MgO) was added in an amount of 314 g. The composition of the resulting recovered solution (9.12 liters) was as follows:

Na=55.9 g/l, Al=11.4 g/l, $CO_3$=0.17 g/l.

Further, the composition of the crystal (893 g) obtained by separation, washing, and drying was as follows:

Na=0.01% by weight, Al=11.4% by weight,

Hg=21.2% by weight, and $CO_3$=4.47% by weight.

Further, the Mg content in the recovered solution was less than 0.005% by weight and the recovery rate of NaOH was 95.6%.

Figure 2:
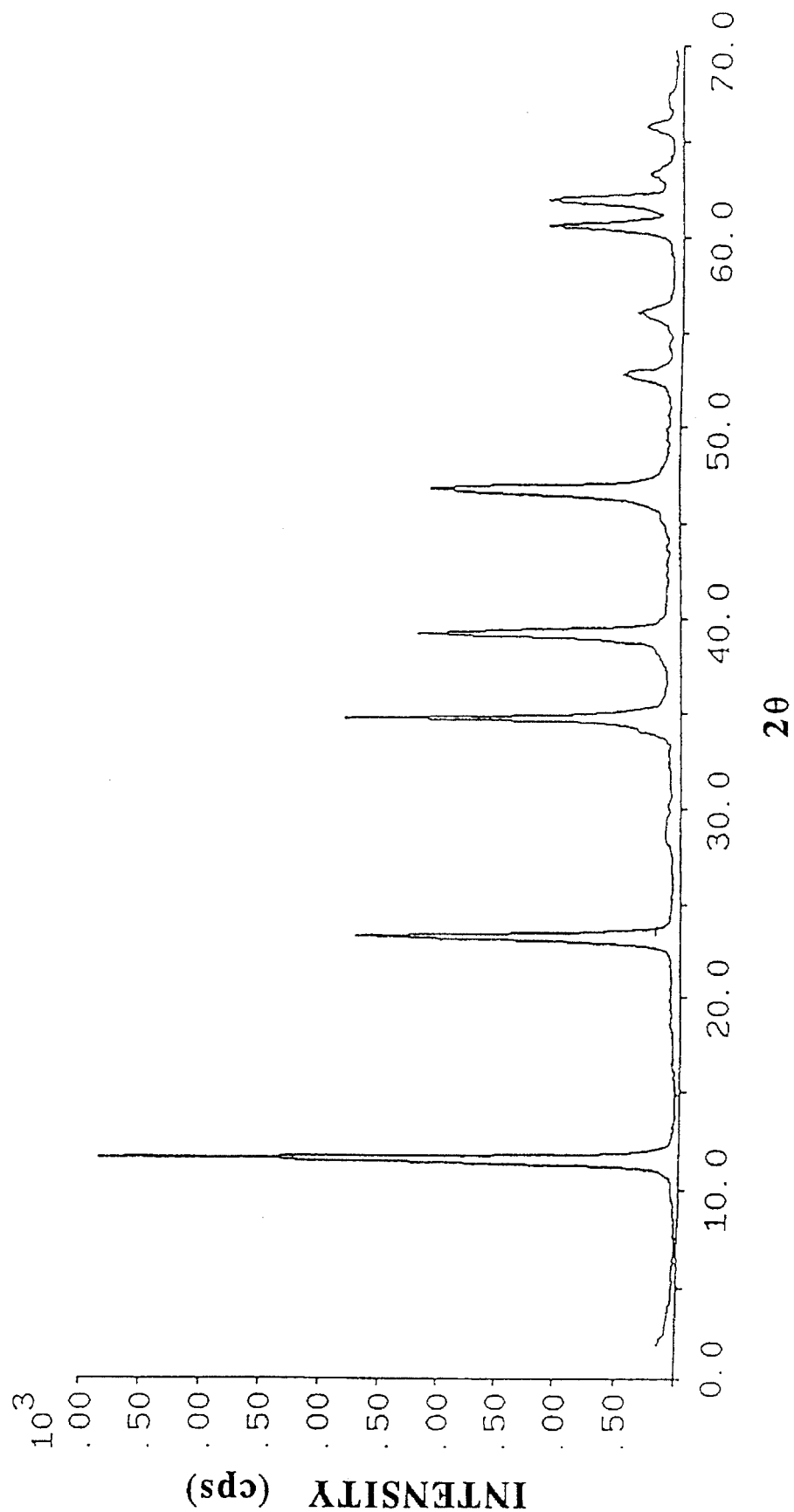
FIG. 2 is an X-ray diffraction pattern of the crystal obtained in Example 2.
Figure 3:
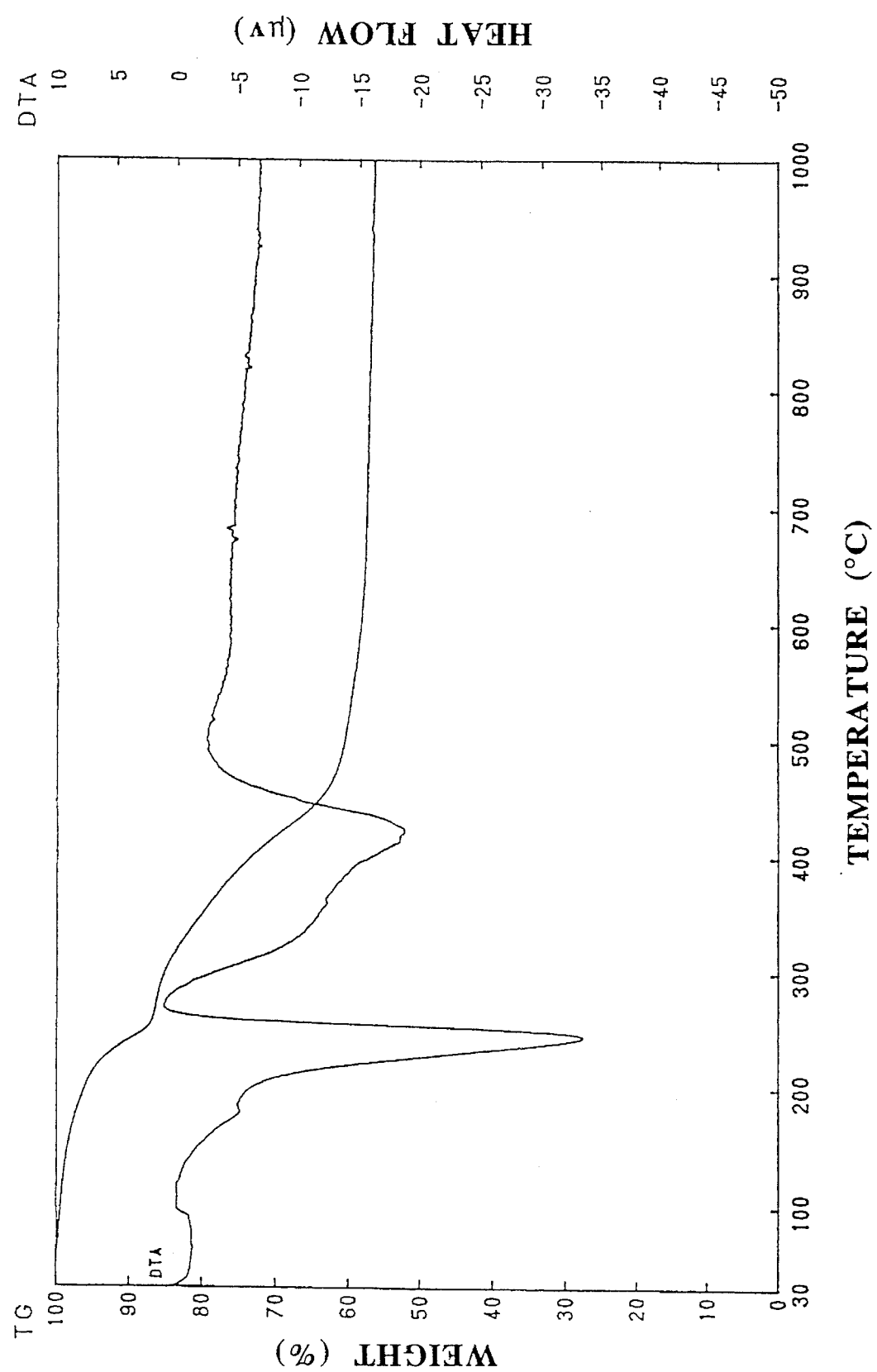
FIG. 3 is a thermogravimetric differential thermal analysis (TG-DTA) pattern of the crystal obtained in Example 2.

An electron micrograph (10000X) of the crystal obtained in Example 2 is shown in FIG. 1. Further, an X-ray diffraction pattern and thermogravimetric differential thermal analysis (TG-DTA) pattern of the crystal are shown in FIGS. 2 and 3, respectively. The composition of the crystal determined from the above data and element analysis and the like is as follows:

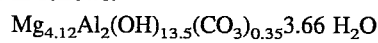
$$Mg_{4.12}Al_2(OH)_{13.5}(CO_3)_{0.35} \cdot 3.66 \, H_2O$$

Example 3

The procedure described in Example 1 was repeated except that magnesium oxide (MgO) was added in an amount of 628 g. The composition of the resulting recovered solution (8.49 liters) was as follows:

Na=55.6 g/l, Al=1.51 g/l, $CO_3$=0.22 g/l.

Further, the composition of the crystal (1207 g) obtained by separation, washing, and drying was as follows:

Na=0.02% by weight, Al=16.19% by weight,

Mg=18.2% by weight, and $CO_3$=3.26% by weight.

Further, the Mg content in the recovered solution was less than 0.001% by weight and the recovery rate of NaOH was 88.5%.

Example 4

The procedure described in Example 1 was repeated except that magnesium oxide (MgO) was added in an amount of 941 g. The composition of the resulting recovered solution (8.16 liters) was as follows:

Na=56.5 g/l, Al=0.06 g/l, $CO_3$=0.21 g/l.

Further, the composition of the crystal (1711 g) obtained by separation, washing, and drying was as follows:

Na=0.02% by weight, Al=12.3% by weight,

Mg=33.2% by weight, and $CO_3$=2.31% by weight.

Further, the Mg content in the recovered solution was less than 0.005% by weight and the recovery rate of NaOH was 86.5%.

Example 5

The procedure described in Example 1 was repeated except that 453 g of magnesium hydroxide [Mg(OH)$_2$] was added instead of 157 g of magnesium oxide (MgO). The composition of the resulting recovered solution (9.1 liters) was as follows:

Na=55.0 g/l, Al=14.3 g/l, $CO_3$=4.56 g/l.

Further, the composition of the crystal (886 g) obtained by separation, washing, and drying was approximately the same as the composition of the crystal obtained in Example 2. Further, the Mg content in the recovered solution was less than 0.005% by weight and the recovery rate of NaOH was 93.9%.

As explained above, the process of the present invention makes it possible to recover recyclable sodium hydroxide from an aluminum-containing sodium hydroxide waste liquor. Further, even if the recovering procedure is repeated, no carbonate ions are accumulated. Therefore, it is possible to prevent degradation of the treating solution containing sodium hydroxide. Further, the by-product is a useful compound, and thus, there is no problem in the reprocessing or disposal of the by-product.

Although the present invention has been described with reference to specific embodiments, various changes and modifications obvious to those skilled in the art are deemed to be within the spirit, scope, and concept of the invention.

What is claimed is:

1. A process for treating aluminum-containing sodium hydroxide waste liquor produced by treating an aluminum article with a sodium hydroxide solution, comprising the steps of:

adding, to aluminum-containing sodium hydroxide waste liquor, at least one of MgO and Mg(OH)$_2$ in an amount of 0.5 to 3 moles with respect to 1 mole of aluminum to cause a reaction at 70° C. or more, said reaction being carried out for at least 4 hours; and separating and removing a precipitated magnesium-aluminum compound.

2. A process according to claim 1, wherein a concentration of sodium hydroxide in the sodium hydroxide waste liquor is adjusted to at least 300 g/l, before adding at least one of MgO and Mg(OH)$_2$.

3. A process according to claim 1, wherein the reaction is carried out at 80° to 120 ° C.

4. A process according to claim 1, wherein the precipitated magnesium-aluminum compound is hydrotalcite of the formula:

$$Mg_xAl_y(OH)_{2x+3y-2z}(CO_3)_z \cdot nH_2O$$

wherein, x and y are positive numbers satisfying $0.5 \leq x/y \leq 10$, z is a number satisfying $0.1 < z < 5$, and n is a number satisfying $0 \leq n \leq 10$.

5. A process according to claim 1, wherein a white crystal of the magnesium-aluminum compound is separated from a mother liquor by suction filtration, centrifugal separation, or filter pressing.

6. A process according to claim 1, wherein a treated sodium hydroxide liquor obtained by removing the crystal of the magnesium-aluminum compound is reused as a treating solution for an aluminum article.

7. A process according to claim 1, wherein the aluminum-containing sodium hydroxide waste liquor is obtained from an alkali washing solution used in a factory manufacturing an aluminum sash.

8. A process according to claim 1, wherein the aluminum-containing sodium hydroxide waste liquor is obtained from an alkali washing solution used in a factory manufacturing an alumite.

9. A process according to claim 1, wherein the aluminum-containing sodium hydroxide waste liquor is obtained from an alkali washing solution used for dies in an aluminum extrusion factory.

10. A process according to claim 1, wherein said reaction is carried out for 6 to 8 hours.

11. A process according to claim 1, wherein said magnesium-aluminum compound is used as a flame retardant without purification.

12. A process according to claim 1, wherein said magnesium-aluminum compound is used as a neutralizing agent for a Ziegler catalyst without purification.

13. A process according to claim 1, wherein said magnesium-aluminum compound is used as a heat stabilizer for polyvinyl chloride without purification.

* * * * *

UNITED STATES PATENT AND TRADEMARK OFFICE
CERTIFICATE OF CORRECTION

PATENT NO. : 5,531,906
DATED : July 2, 1996
INVENTOR(S) : Susumu Takayama, et al.

It is certified that error appears in the above-identified patent and that said Letters Patent is hereby corrected as shown below:

The title page, should be deleted to appear as per attached title page.

On the title page, item [30] Foreign Application Priority Data, change "1994" to --1993--.

Signed and Sealed this

Fifth Day of August, 1997

Attest:

BRUCE LEHMAN

Attesting Officer

Commissioner of Patents and Trademarks

United States Patent [19]
Takayama et al.

[11] Patent Number: 5,531,906
[45] Date of Patent: Jul. 2, 1996

[54] PROCESS FOR TREATMENT OF SODIUM HYDROXIDE WASTE LIQUOR CONTAINING ALUMINUM

[75] Inventors: Susumu Takayama; Yasuie Mikami; Nobuyoshi Iyatomi; Minoru Orikasa, all of Tokyo, Japan

[73] Assignee: Nittetsu Mining Co., Ltd., Tokyo, Japan

[21] Appl. No.: 283,532

[22] Filed: Aug. 1, 1994

[30] Foreign Application Priority Data

Jul. 30, 1994 [JP] Japan .................. 5-208784

[51] Int. Cl.$^6$ .................................. C02F 1/62
[52] U.S. Cl. .................. 210/712; 210/912; 423/115; 423/420.2; 423/600
[58] Field of Search .................. 210/712, 912; 423/115, 420.2, 600

[56] References Cited

U.S. PATENT DOCUMENTS

| | | | |
|---|---|---|---|
| 3,539,306 | 11/1970 | Kumura et al. | 423/432 |
| 4,539,195 | 9/1985 | Schanz et al. | 423/420.2 |
| 4,560,545 | 12/1985 | Spickett et al. | 423/420.2 |
| 4,566,912 | 1/1986 | Borg | 210/712 |
| 4,904,457 | 2/1990 | Misra | 423/420.2 |
| 5,250,279 | 10/1993 | Preston et al. | 423/420.2 |

FOREIGN PATENT DOCUMENTS

| | | | |
|---|---|---|---|
| 5021 | 1/1985 | Japan | 423/420.2 |

OTHER PUBLICATIONS

Journal of Solid State Chemistry, vol. 94, No. 2, 1991, pp. 244–253, Ian E. Grey and Roland Ragozzini, "Formation and Characterization of New Magnesium Aluminum Hydroxycarbonates".

Database WPI Week 7648, Derwent Publications, Ltd., London, GB; AN 76-89679X/48 for JP-A-51 117 196 (Nittetsu Mining Ltd) 16 Oct. 1976.

Database WPI Week 8808, Derwent Publications, Ltd., London, GB; AN 88-052711/08 for JP-A-63 008 215 (Kureha Chem Ind KK) 14 Jan. 1988.

*Primary Examiner*—Neil McCarthy
*Attorney, Agent, or Firm*—Sughrue, Mion, Zinn, Macpeak & Seas

[57] ABSTRACT

A process for treating sodium hydroxide waste liquor containing aluminum, comprising the steps of: adding, to aluminum-containing sodium hydroxide waste liquor, at least one of MgO and Mg(OH)$_2$ in an amount of 0.5 to 3 moles with respect to 1 mole of aluminum to cause a reaction at 70° C. or more; and separating and removing a precipitated magnesium-aluminum compound is disclosed. The present invention makes it possible to recover recyclable sodium hydroxide from an aluminum-containing sodium hydroxide waste liquor. Even if the recovering procedure is repeated, no carbonate ions are accumulated. Therefore, it is possible to prevent degradation of the treating solution containing sodium hydroxide. Further, the by-product is a useful compound, and thus, there is no problem in the reprocessing or disposal of the by-product.

13 Claims, 3 Drawing Sheets

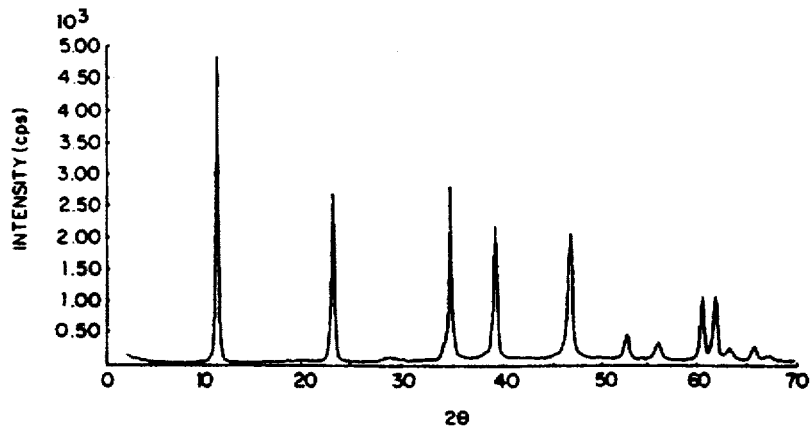

UNITED STATES PATENT AND TRADEMARK OFFICE
CERTIFICATE OF CORRECTION

PATENT NO. : 5,531,906
DATED : July 2, 1996
INVENTOR(S) : Susumu TAKAYAMA et al

It is certified that error(s) appears in the above-identified patent and that said Letters Patent is hereby corrected as shown below:

Claim 2, line 3, delete "at least 300 g/l" and insert therefor --300 g/l or less--.

Signed and Sealed this

Second Day of June, 1998

Attest:

BRUCE LEHMAN

Attesting Officer     Commissioner of Patents and Trademarks